United States Patent [19]

Butts

[11] Patent Number: 5,529,018
[45] Date of Patent: Jun. 25, 1996

[54] ANIMAL SEAT BELT HARNESS

[76] Inventor: Margaret M. Butts, Rte. 2A, Box 2260, Houlton, Me. 04730

[21] Appl. No.: 398,968

[22] Filed: Mar. 2, 1995

[51] Int. Cl.⁶ ................................. A01K 29/00
[52] U.S. Cl. ..................................... 119/792
[58] Field of Search .................. 119/769, 771, 119/792, 793, 795, 797, 798, 907, 856; 128/869, 870, 874, 875, 876; 297/465, 485, 473; 280/801

[56] References Cited

U.S. PATENT DOCUMENTS

| 1,574,672 | 2/1926 | McCarroll-Doull | 128/875 |
| 2,170,703 | 8/1939 | Waxman et al. | 297/465 |
| 3,099,486 | 7/1963 | Scott | 297/465 |
| 3,310,034 | 3/1967 | Dishart | 119/771 |

*Primary Examiner*—Thomas Price

[57] ABSTRACT

A harness for restraining a pet within a vehicle. The inventive device includes a harness assembly for securing to a body of an animal. An anterior mounting assembly extends forwardly of the harness assembly for securing to a seat belt of a vehicle, and a posterior mounting assembly extends rearwardly of the harness assembly for securing to the seat belt so as to restrain the animal within the vehicle.

5 Claims, 4 Drawing Sheets

ANIMAL SEAT BELT HARNESS

BACKGROUND OF THE INVENTION

1. Field of the Invention

The present invention relates to restraining device belt and more particularly pertains to an animal seat belt harness for restraining a pet within a vehicle.

2. Description of the Prior Art

The use of restraining devices is known in the prior art. More specifically, restraining devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art restraining devices include U.S. Pat. No. 5,167,203; 5,154,660; 5,123,377; 5,044,321; and 4,791,886.

While these devices fulfill their respective, particular objectives and requirements, the aforementioned patents do not disclose an animal seat belt harness for restraining a pet within a vehicle which includes a harness assembly for securing to a body of an animal, an anterior mounting assembly extending forwardly of the harness assembly for securing to a seat belt of a vehicle, and a posterior mounting assembly extending rearwardly of the harness assembly for securing to the seat belt so as to restrain the animal within the vehicle during deceleration thereof.

In these respects, the animal seat belt harness according to the present invention substantially departs from the conventional concepts and designs of the prior art, and in so doing provides an apparatus primarily developed for the purpose of restraining a pet within a vehicle.

SUMMARY OF THE INVENTION

In view of the foregoing disadvantages inherent in the known types of restraining devices now present in the prior art, the present invention provides a new animal seat belt harness construction wherein the same can be utilized for restraining a pet within a vehicle during deceleration thereof. As such, the general purpose of the present invention, which will be described subsequently in greater detail, is to provide a new animal seat belt harness apparatus and method which has many of the advantages of the restraining devices mentioned heretofore and many novel features that result in an animal seat belt harness which is not anticipated, rendered obvious, suggested, or even implied by any of the prior art restraining devices, either alone or in any combination thereof.

To attain this, the present invention generally comprises a harness for restraining a pet within a vehicle. The inventive device includes a harness assembly for securing to a body of an animal. An anterior mounting assembly extends forwardly of the harness assembly for securing to a seat belt of a vehicle, and a posterior mounting assembly extends rearwardly of the harness assembly for securing to the seat belt so as to restrain the animal within the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new animal seat belt harness apparatus and method which has many of the advantages of the restraining devices mentioned heretofore and many novel features that result in a animal seat belt harness which is not anticipated, rendered obvious, suggested, or even implied by any of the prior art restraining devices, either alone or in any combination thereof.

It is another object of the present invention to provide a new animal seat belt harness which may be easily and efficiently manufactured and marketed.

It is a further object of the present invention to provide a new animal seat belt harness which is of a durable and reliable construction.

An even further object of the present invention is to provide a new animal seat belt harness which is susceptible of a low cost of manufacture with regard to both materials and labor, and which accordingly is then susceptible of low prices of sale to the consuming public, thereby making such animal seat belt harness economically available to the buying public.

Still yet another object of the present invention is to provide a new animal seat belt harness which provides in the apparatuses and methods of the prior art some of the advantages thereof, while simultaneously overcoming some of the disadvantages normally associated therewith.

Still another object of the present invention is to provide a new animal seat belt harness for restraining a pet within a vehicle.

Yet another object of the present invention is to provide a new animal seat belt harness which includes a harness assembly for securing to a body of an animal, an anterior mounting assembly extending forwardly of the harness assembly for securing to a seat belt of a vehicle, and a posterior mounting assembly extending rearwardly of the harness assembly for securing to the seat belt so as to restrain the animal within the vehicle during deceleration thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
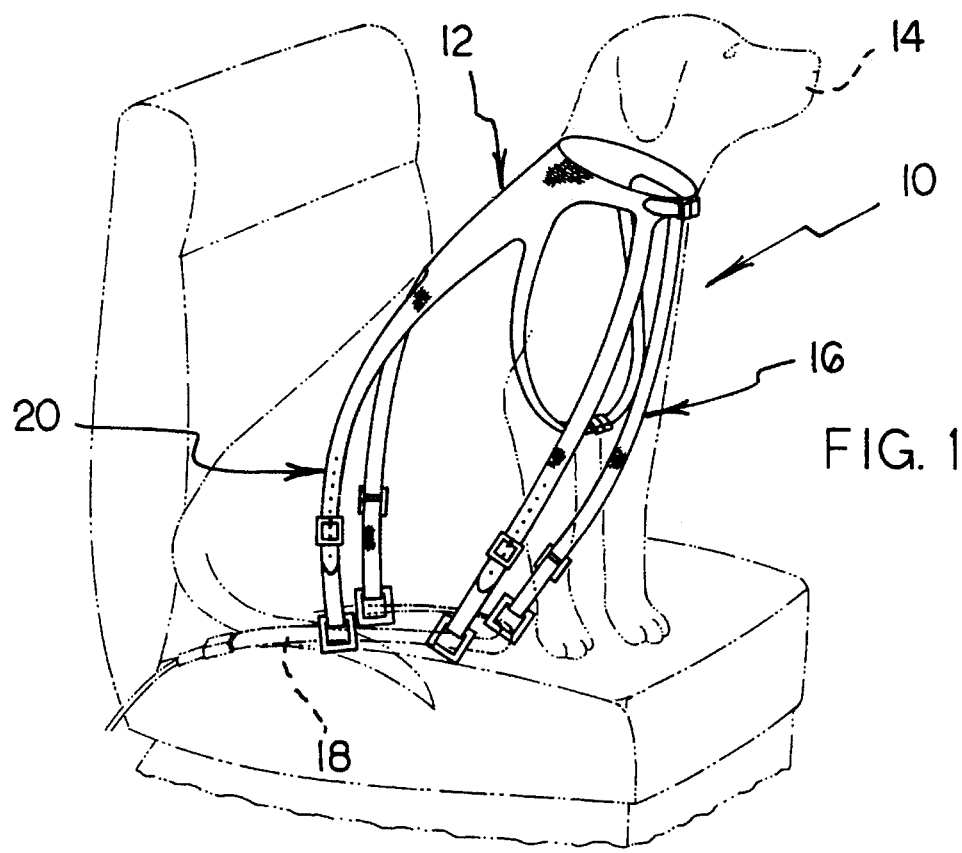
FIG. 1 is an isometric illustration of an animal seat belt harness according to the present invention in use.

With reference now to the drawings, and in particular to FIGS. 1–8 thereof, a new animal seat belt harness embodying the principles and concepts of the present invention and generally designated by the reference numeral 10 will be described.

More specifically, it will be noted that the animal seat belt harness 10 comprises a harness means 12 for securing to a body of an animal 14, as illustrated in FIG. 1 of the drawings. An anterior mounting means 16 extends forwardly of the harness means 12 for securing to a seat belt 18 of an unillustrated vehicle. A posterior mounting means 20 extends rearwardly of the harness means 12 for securing to the seat belt 18. By this structure, an animal 14 can be easily restrained within a vehicle during deceleration thereof such as occurs during a crash or impacting of the vehicle against another object to protect the animal 14 from secondary impacts against interior portions of the vehicle.

Figure 2:
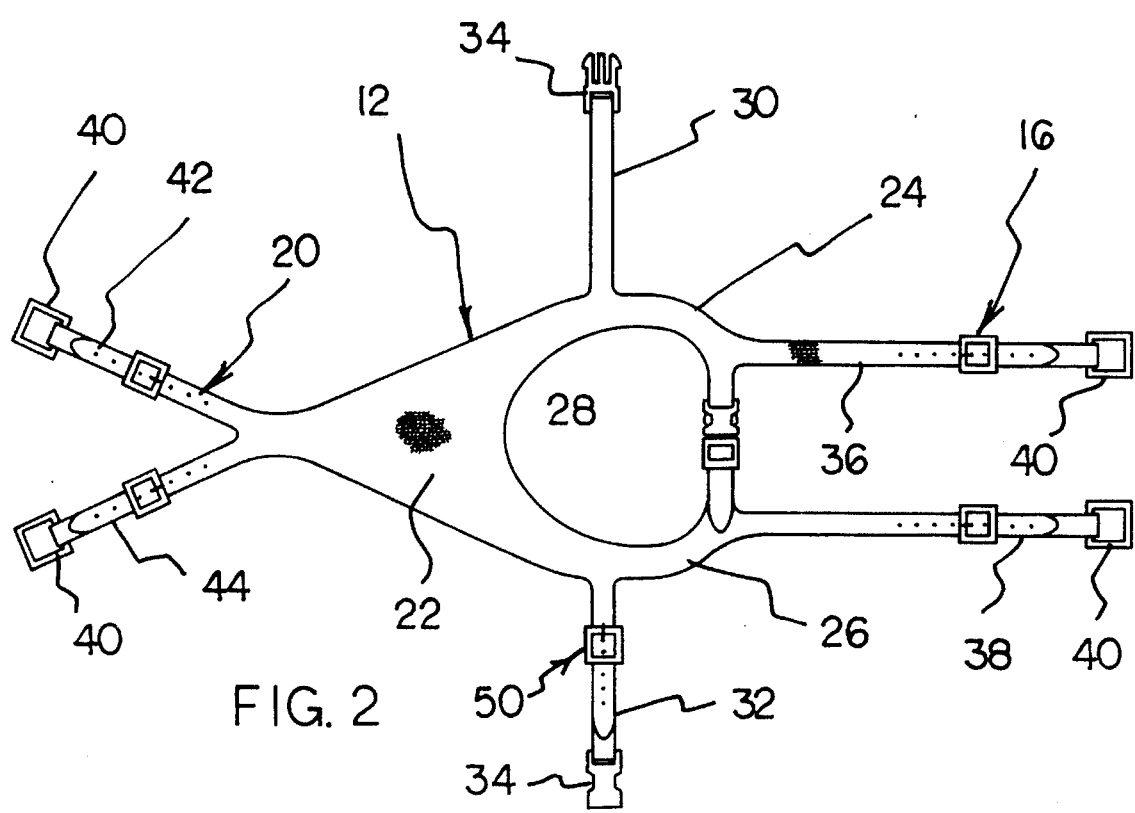
FIG. 2 is a plan view of the present invention, per se.

As best illustrated in FIG. 2, it can be shown that the harness means 12 according to the present invention 10 preferably comprises a back web 22 positionable along a posterior portion of the animal 14. A first collar strap 24 extends from a first side of the back web 22, with a second collar strap 26 extending from a second side of the back web and cooperable with the first collar strap so as to extend about a neck of the animal 14. A collar strap fastener 28 couples the collar straps 24 and 26 together about the neck of animal 14 as shown in FIG. 1 of the drawings. The harness means 12 further comprises a first chest strap 30 extending from a first side of the back web 22, and a second chest strap 32 extending from a second side of the back web 22. The chest straps 30 and 32 each include a chest strap fastener 34 which can be cooperatively mated together so as to secure the chest straps about the chest or body portion of the animal 14 as shown in FIG. 1.

With continuing reference to FIG. 2, it can be shown that the anterior mounting means 16 according to the present invention 10 preferably comprises a first anterior strap 36 secured to the first collar strap 24, and a second anterior strap 38 secured to the second collar strap 26. The anterior straps 36 and 38 extend forwardly of the collar straps 24 and 26 and each terminate in an anchor loop 40 through which the seat belt 38 can be passed as shown in FIGS. 1 and 3 so as to secure the anterior straps relative thereto.

With continuing reference to FIG. 2, it can be shown that the posterior mounting means 20 according to the present invention 10 similarly comprises a first posterior strap 42 coupled to and extending from the back web 22, and a second posterior strap 44 similarly coupled to the back web. The posterior straps 42 and 44 extend rearwardly of the harness means 12 in a direction opposite that of the anterior straps 36 and 38. Each of the posterior straps 42 and 44 terminates in an anchor loop 40 through which the seat belt 18 can be passed as shown in FIGS. 1 and 3 of the drawings. By this structure, the mounting means 16 and 20 operate to secure the animal 14 relative to a seat of the vehicle and cooperates to provide the synergistic effect of restraining the animal 14 along both anterior and posterior portions thereof so as to preclude rotational motion of the animal 14 as would occur if only a single one of the mounting means 16 and 20 was employed.

Figure 4:
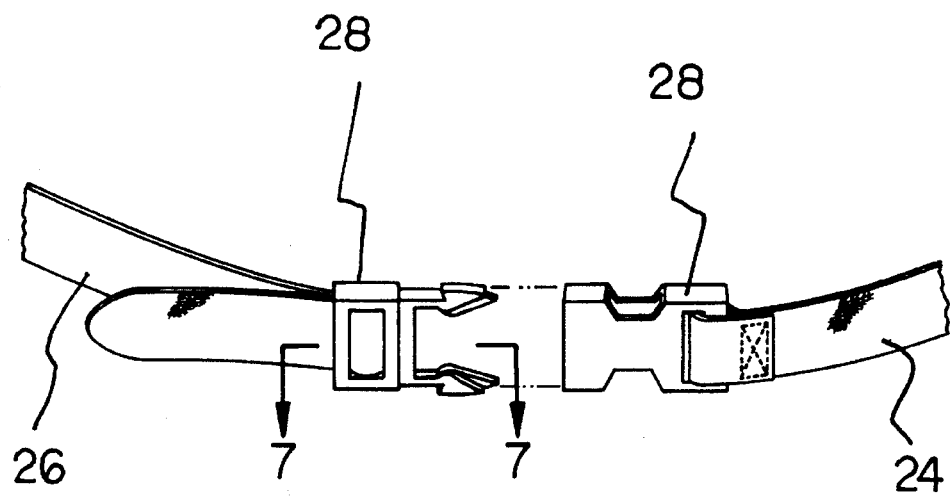
FIG. 4 is an exploded isometric illustration of another portion of the present invention.
Figure 5:
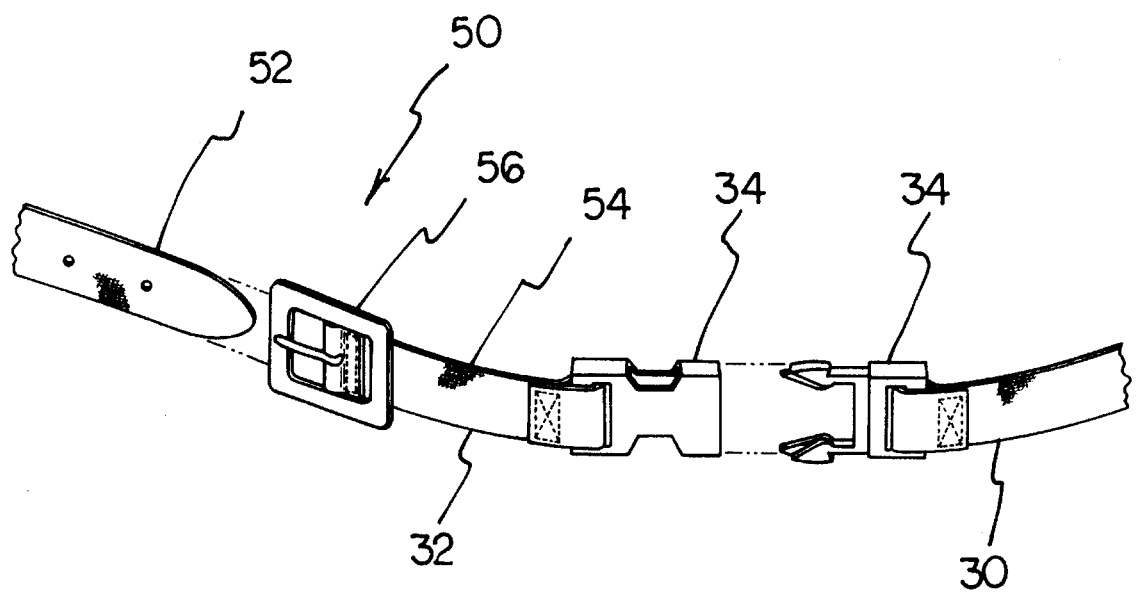
FIG. 5 is an exploded isometric illustration of a further portion of the present invention.
Figure 7:
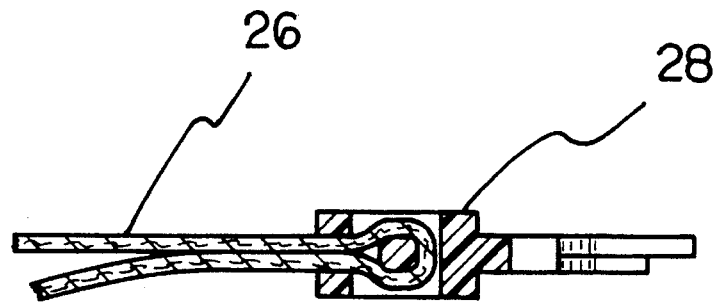
FIG. 7 is a cross sectional view taken along line 7—7 of FIG. 4.
Figure 8:
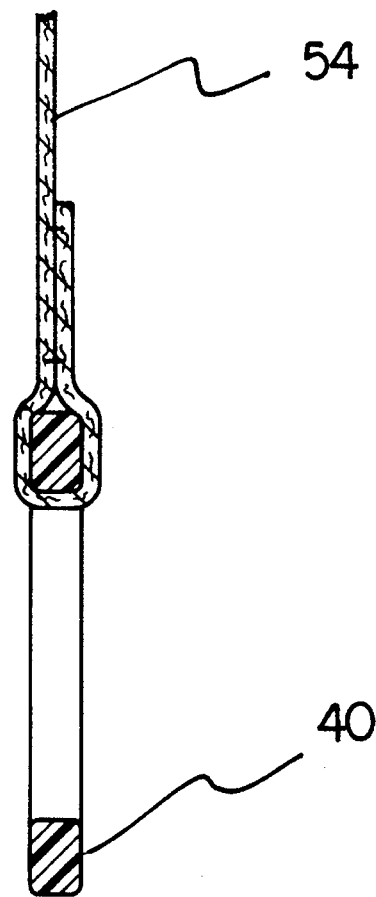
FIG. 8 is a cross sectional view taken along line 8—8 of FIG. 6.

As shown in FIGS. 4 and 7, the collar strap fasteners 28 can be selectively decoupled to facilitate positioning of the collar straps 24 and 26 about the neck of the animal 14. As shown in FIG. 5, the chest strap fasteners 34 can be similarly decoupled to permit separation of the first chest strap 30 from the second chest strap 32 prior to re-coupling thereof about the body of the animal 14.

Figure 3:
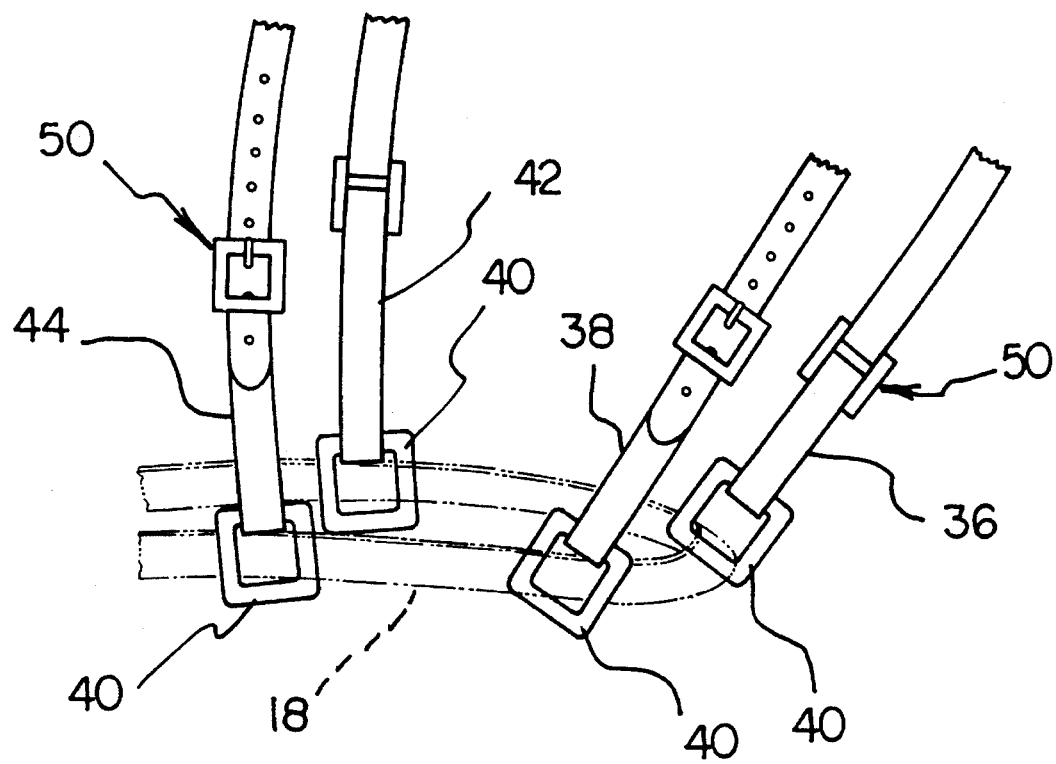
FIG. 3 is an enlarged isometric illustration of a portion of the present invention in use.
Figure 6:
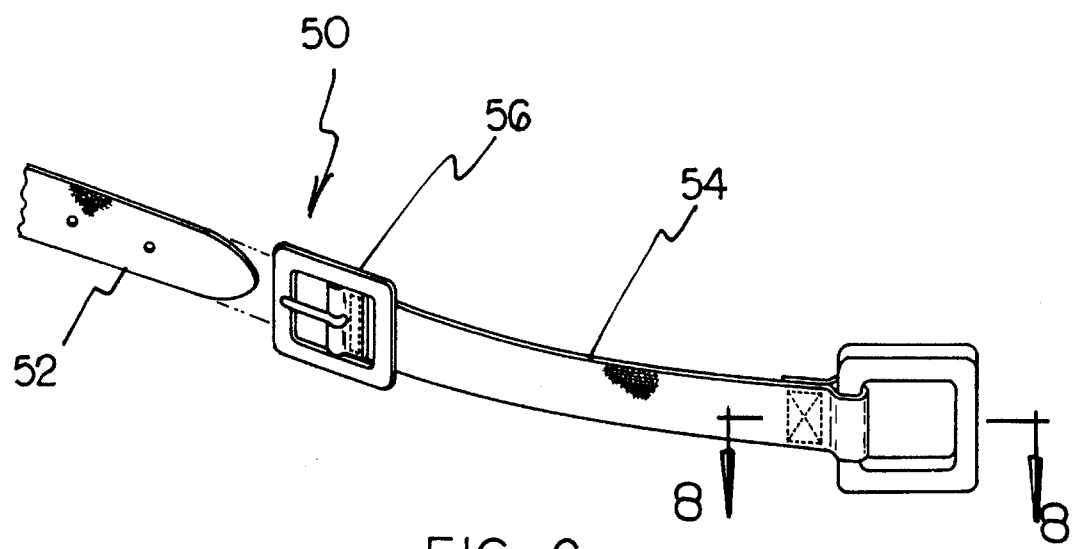
FIG. 6 is an exploded isometric illustration of yet a further portion of the present invention.

As shown FIGS. 2 and 3, the second chest strap 32, the anterior straps 36 and 38, and the posterior straps 42 and 44 may be provided with an adjustment means 50 for adjusting a longitudinal length thereof. To this end, and as shown in FIGS. 5 and 6 of the drawings, the straps may be separated into a first strap portion 52 having a plurality of apertures directed therethrough, and a second strap porion 54 having a buckle 56 coupled to a free distal end thereof. The buckle 56 is thus operable to receive the first strap portion 52 and engage one of the apertures directed therethrough so as to secure the second strap portion 54 to the first strap portion 52 at a desired longitudinal position along the first strap. By this structure, the straps 32, 36, 38, 42, and 44 can be selectively adjusted to a desired length so as to securely fasten the animal 14 within the vehicle.

In use, the animal seat belt harness 10 according to the present invention can be easily utilized to secure an animal 14 within a vehicle through a coupling of the mounting means 16 and 20 to the seat belt 18 of the vehicle. The present invention 10 serves to restrain the animal 14 within the vehicle during deceleration thereof so as to preclude injury to such animal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An animal seat belt harness comprising;

a harness means for securing to a body of an animal, said harness means comprising a back web positionable along a posterior portion of the animal; a first collar strap extending forwardly from a first side of said back web; a second collar strap extending forwardly from a second side of said back web and cooperable with said first collar strap so as to extend about a neck of the animal; said collar straps having cooperating fasteners coupled thereto; and a first chest strap extending forwardly from a first side of said back web and cooperatively fastenable to a second chest strap extending forwardly from a second side of said back web to secure about the chest portion of an animal;

an anterior mounting means extending forwardly of the harness means for securing to a seat belt of a vehicle, said anterior mounting means comprising a first anterior strap secured to said first collar strap and a second anterior strap secured to said second collar strap, the anterior straps extending forwardly of and downwardly from the collar straps and each terminating in an anchor loop through which the seat belt can be passed so as to secure the anterior straps relative thereto;.

a posterior mounting means comprising a first posterior strap coupled to and extending from said back web; and a second posterior strap coupled to and extending from said back web, the posterior straps extending rearwardly of and downwardly from the harness means, each of the posterior straps terminating in an anchor loop through which the seat belt can be passed so as to secure the posterior straps thereto.

2. The animal seat belt harness of claim 1, wherein the second chest strap includes an adjustment means for adjusting a longitudinal length thereof.

3. The animal seat belt harness of claim 2, wherein the anterior straps include an adjustment means for adjusting a longitudinal length thereof.

4. The animal seat belt harness of claim 3, wherein the posterior straps include an adjustment means for adjusting a longitudinal length thereof.

5. The animal seat belt of claim 4, wherein each said adjustment means are defined by each said respective straps including a first strap portion having a plurality of apertures directed therethrough, and a second strap portion having a buckle coupled to a free distal end thereof, the buckle being operable to receive the first strap portion and engage one of the apertures directed therethrough so as to secure the second strap portion to the first strap portion at a desired longitudinal position along the first strap.

* * * * *